(12) United States Patent
Araki et al.

(10) Patent No.: US 9,939,686 B2
(45) Date of Patent: Apr. 10, 2018

(54) DISPLAY DEVICE

(71) Applicant: Sony Corporation, Tokyo (JP)

(72) Inventors: Soya Araki, Kanagawa (JP); Takeshi Yamamoto, Tokyo (JP); Yuki Takano, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/790,429

(22) Filed: Oct. 23, 2017

(65) Prior Publication Data
US 2018/0045996 A1 Feb. 15, 2018

Related U.S. Application Data

(63) Continuation of application No. 15/427,301, filed on Feb. 8, 2017, which is a continuation of application No. 14/570,216, filed on Dec. 15, 2014, now Pat. No. 9,618,798.

(30) Foreign Application Priority Data

Dec. 25, 2013 (JP) .................................. 2013-267723

(51) Int. Cl.
G02F 1/1339 (2006.01)
G02F 1/1341 (2006.01)
G02F 1/1333 (2006.01)
G02F 1/1345 (2006.01)

(52) U.S. Cl.
CPC .......... *G02F 1/1339* (2013.01); *G02F 1/1341* (2013.01); *G02F 1/1345* (2013.01); *G02F 1/13394* (2013.01); *G02F 1/133351* (2013.01); *G02F 2001/133331* (2013.01)

(58) Field of Classification Search
CPC .... G02F 1/1339; G02F 1/1341; G02F 1/1345; G02F 1/133351; G02F 1/13394; G02F 2001/133331
See application file for complete search history.

(56) References Cited

U.S. PATENT DOCUMENTS

| 5,155,612 | A | 10/1992 | Adachi et al. |
| 5,610,742 | A | 3/1997 | Hinata et al. |
| 5,739,880 | A | 4/1998 | Suzuki et al. |
| 6,204,906 | B1 | 3/2001 | Tannas, Jr. |
| 6,509,949 | B1 | 1/2003 | Lu et al. |
| 6,654,083 | B1 | 11/2003 | Toda et al. |
| 6,703,643 | B2 | 3/2004 | Yamazaki et al. |
| 8,049,831 | B2 | 11/2011 | Kim et al. |
| 8,792,252 | B2 | 7/2014 | Hwang et al. |
| 8,821,966 | B2 | 9/2014 | Toyoda et al. |
| 8,905,807 | B2 | 12/2014 | Kim et al. |
| 8,994,909 | B2 | 3/2015 | Kira et al. |
| 2008/0137023 | A1 | 6/2008 | Shimizu et al. |
| 2010/0214521 | A1 | 8/2010 | Togashi et al. |
| 2014/0160419 | A1 | 6/2014 | Lee et al. |

(Continued)

FOREIGN PATENT DOCUMENTS

JP 2008-304630 A 12/2008

*Primary Examiner* — Joseph L Williams
*Assistant Examiner* — Jose M Diaz
(74) *Attorney, Agent, or Firm* — Lerner, David, Littenberg, Krumholz & Mentlik, LLP

(57) ABSTRACT

Provided is a display device, including: a display panel that includes a display layer on at least a first substrate; and a sealing resin layer that is provided on a peripheral edge of the display panel, wherein a surface of the sealing resin layer and a surface of the display panel include a same plane.

9 Claims, 7 Drawing Sheets

(56) References Cited

U.S. PATENT DOCUMENTS

2014/0204293 A1 7/2014 Kim et al.
2015/0185516 A1 7/2015 Lee et al.
2015/0253604 A1 9/2015 He et al.
2016/0224879 A1 8/2016 Amarnath et al.

DISPLAY DEVICE

CROSS REFERENCE TO RELATED APPLICATIONS

This application is a continuation of U.S. patent application Ser. No. 15/427,301, filed on Feb. 8, 2017, which is a continuation of U.S. patent application Ser. No. 14/570,216, filed on Dec. 15, 2014, issued as U.S. Pat. No. 9,618,798 on Apr. 11, 2017 which claims the benefit of Japanese Priority Patent Application JP 2013-267723 filed on Dec. 25, 2013, the entire contents of which are incorporated herein by reference.

BACKGROUND

The present disclosure relates to a display device such as a television set.

For display devices typified by a liquid crystal display device, an organic EL display device, and an electrophoretic display device, and so on, there has been desired weight reduction and enhanced designability. A general display device has a configuration in which a display panel is accommodated in a casing (for example, Japanese Unexamined Patent Application Publication No. 2008-304630). The casing includes, for example, a first frame, a second frame, and a back surface cover, and so on. The first frame covers a part (an outer edge) of a front surface of the display panel. The second frame supports the display panel from behind a back surface.

SUMMARY

In recent years, progress in technology of display panels or electronic components allows thinning of display devices, as well as improvement in designability of appearance. However, since display devices configured as described above have limitations in weight reduction and enhancement of designability, there has been desired further improvement.

It is desirable to provide a display device that makes it possible to reduce weight and enhance designability.

According to an embodiment of the present technology, there is provided a display device including: a display panel that includes a display layer on at least a first substrate; and a sealing resin layer that is provided on a peripheral edge of the display panel, wherein a surface of the sealing resin layer and a surface of the display panel include a same plane.

In the display device according to the above-described embodiment of the present technology, since the peripheral edge of the display panel is sealed by the sealing resin layer that includes the same plane as the surface of the display panel, a configuration of structural members is simplified. For example, it becomes possible to eliminate a front surface member.

According to the display device in the above-described embodiment of the present technology, the sealing resin layer is provided on the peripheral edge of the display panel, and the sealing resin layer includes the same plane as the surface of the display panel. This leads to a simplified configuration of structural members, making it possible to reduce weight and enhance designability. It is to be noted that some effects described here are not necessarily limitative, and any of other effects described herein may be achieved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinbelow, some embodiments of the present disclosure will be described in detail in the following order, with reference to the accompanying drawings.

1. Embodiment (an example in which a polarization plate on a front surface side and a sealing resin layer include a same plane)
   1-1. Configuration of Main Part
   1-2. Overall Configuration
2. Modification Example (an example in which the front side polarization plate is extended to an end surface of the sealing resin layer)
3. Application Example

1. Embodiment (1-1. Configuration of a Main Part)

Figure 1:
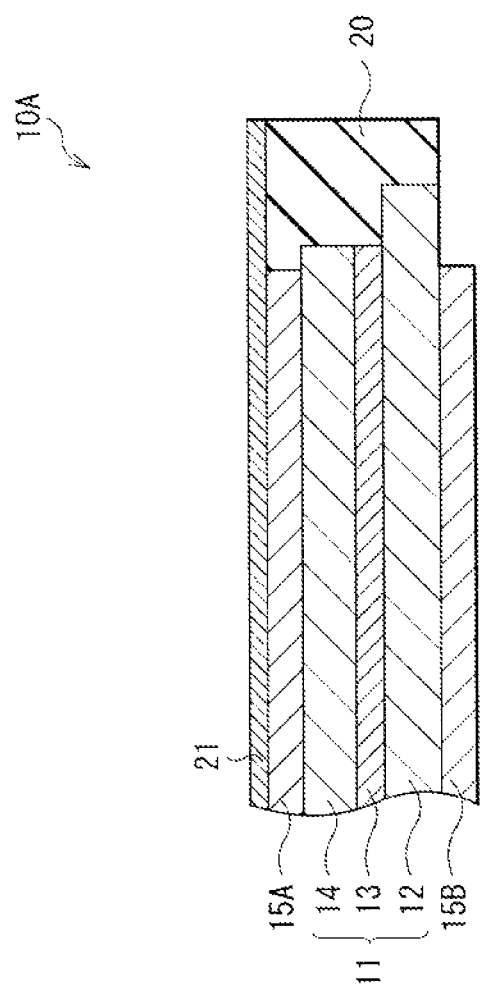
FIG. 1 is a cross-sectional view illustrating a configuration of a main part of a display device according to one embodiment of the present disclosure.

FIG. 1 illustrates a cross-sectional configuration of a main part (a display panel 10A and its periphery) of a display device (a display device 1) according to one embodiment of the present disclosure. In the display device 1, a sealing resin layer 20 is provided on a peripheral edge of the display panel 10A. A surface of the sealing resin layer 20 and a surface of the display panel 10A (specifically, a polarization plate 15A) include a same plane. To the surfaces of the display panel 10A and the sealing resin layer 20, a lamination film 21 may be attached.

The display panel 10A is adapted to display images such as moving images or still images or the like, and may include, for example, a cell 11 that may include a display layer (here, a liquid crystal layer 13) between two substrates, i.e. a TFT substrate 12 (a first substrate) and a color filter (CF) substrate 14 (a second substrate). The cell 11 may include a polarization plate 15A (on a front surface side) and a polarization plate 15B (on a back surface side) that are adapted to allow polarized light in a specific direction to pass through. The polarization plates 15A and 15B may be provided on opposite surfaces (a front surface (a display surface) and a back surface) to the liquid crystal layer 13 of the TFT substrate 12 and the CF substrate 14, respectively.

The TFT substrate 12 may have a configuration in which, for example, a plurality of pixel electrodes (not illustrated) are arranged in a matrix on a glass substrate. The TFT substrate 12 may be provided with TFT (thin film transistor) devices, and gate lines and source lines (neither illustrated). The TFT devices are configured to drive the plurality of pixel electrodes. The gate lines and the source lines are connected to the TFT devices. The pixel electrodes may be configured of a transparent conductive material such as ITO (indium tin oxide), and may be formed for each subpixel (not illustrated) on the glass substrate.

The CF substrate 14 may include, on a glass substrate, a color filter (not illustrated) together with an opposite electrode (not illustrated). The color filter may include, for example, filters of red (R), green (G), and blue (B) in stripe shapes. The opposite electrode may be provided on a substantially entire surface of an effective display region S2 over the color filter (refer to FIG. 2). The opposite electrode may be configured of a transparent conductive material such as ITO, similarly to the above-mentioned pixel electrode. It is to be noted that, although not illustrated, a spacer may be provided between the opposite electrode and the pixel electrode on the TFT substrate 12 side in order to maintain a gap between both substrates.

The liquid crystal layer 13 may include, for example, in a case of a liquid crystal panel of vertical alignment type, liquid crystal molecules and a polymer structure. The liquid crystal molecules have negative dielectric anisotropy. The polymer structure is adapted to hold the liquid crystal molecules in the vicinity of a boundary with an orientation film (not illustrated). The liquid crystal molecule has a property that a dielectric constant in a long axis direction is larger than that in a short axis direction. This property allows the liquid crystal molecules to be aligned with long axes of the liquid crystal molecules vertical to the substrate when a drive voltage is OFF, and with the long axes of the liquid crystal molecules parallel to the substrate when the drive voltage becomes ON. Thus, an image is displayed on the liquid crystal panel. It is to be noted that the liquid crystal layer 13 may be sealed by a sealing section (not illustrated) that is provided on a periphery of the liquid crystal layer 13 between the TFT substrate 12 and the CF substrate 14.

The sealing resin layer 20 is provided, as mentioned above, on the peripheral edge of the display panel 10A. This allows a level difference in an end surface of the cell 11 to be planarized. The level difference is caused by a combination of structural members having different sizes from each other (that is, the substrates 12 and 14, and the polarization plates 15A and 15B). Further, in the present embodiment, the surface of the sealing resin layer 20 and the surface of the planarization plate 15A on the display surface side form a same plane.

For the sealing resin layer 20, for example, general resin materials may be used. In particular, a photocurable resin may be preferably used. Specific examples may include an acrylic resin, an epoxy resin, and a silicone resin. Among them, one that has low shrinkage after curing may be preferable, and in particular, a silicone resin may be suitable. The sealing resin layer 20 may be colored; for example, coloring in black makes it possible to reduce light leakage from a side surface of the liquid crystal layer 13 or the like. Examples of methods of coloring the sealing resin layer 20 may include adding a colorant, or using a resin material that is configured to change in color (to be colored) by light irradiation at the time of curing. For the colorant, one that is capable of maintaining a transmittance of a sealing resin material may be preferable; specific examples may include carbon black, or a metal-containing dye, or the like.

It is to be noted that the sealing resin layer 20 is not limited to a case that the sealing resin layer 20 is provided on the entire peripheral edge of the display panel 10A. For example, the sealing resin layer 20 may be provided along only one side of the display panel 10 in a rectangular shape as illustrated FIG. 2. Alternatively, the sealing resin layer 20 may be provided along four sides intermittently. The sealing resin layer 20 may be provided as necessary.

(1-2. Overall Configuration)

Figure 2:
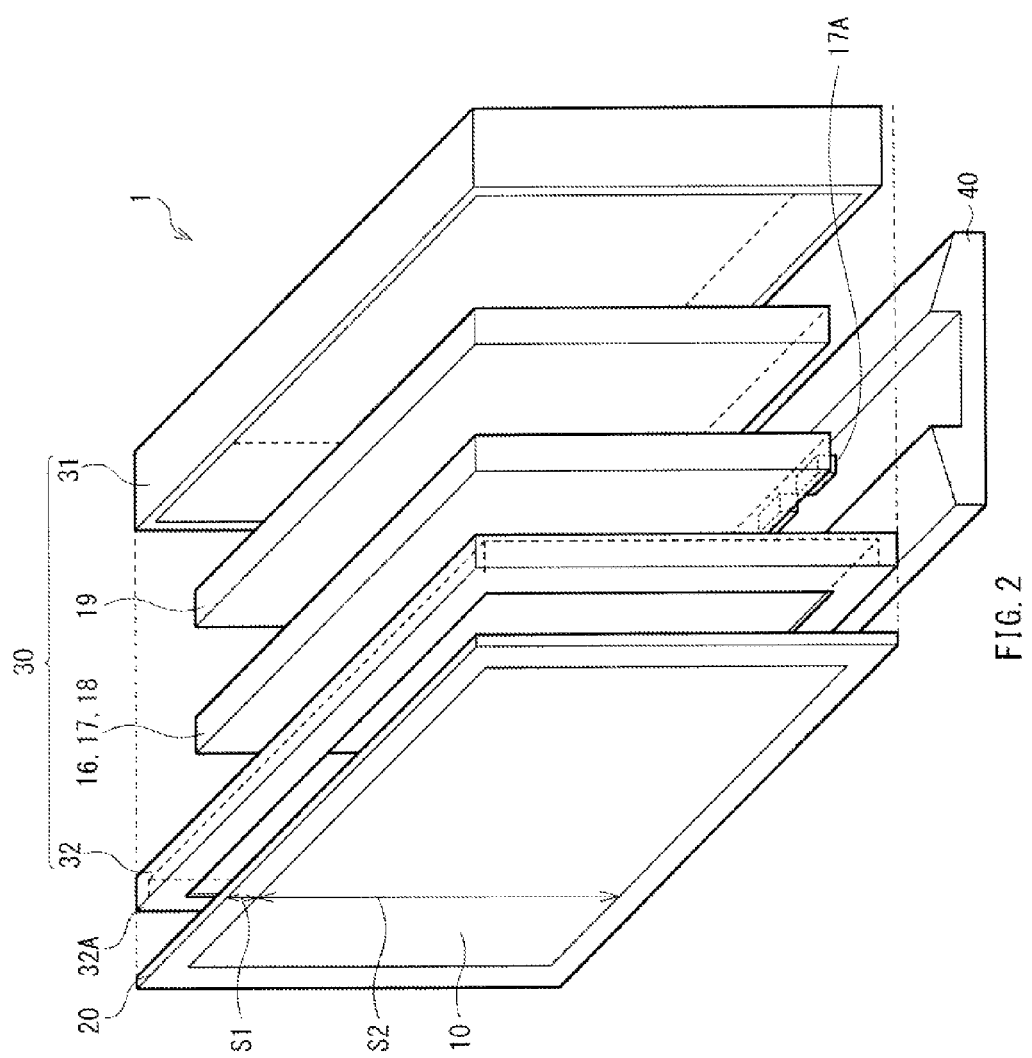
FIG. 2 is a perspective view illustrating, in an exploded manner, an overall configuration of the display device illustrated in FIG. 1.
Figure 3:
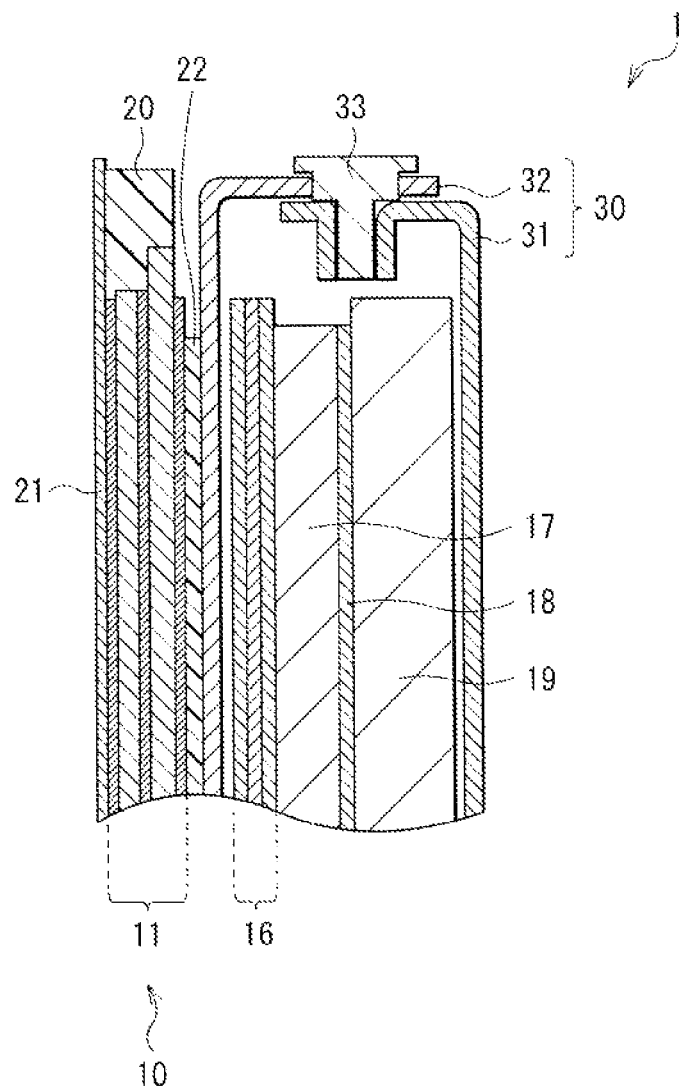
FIG. 3 is a cross-sectional view of the display device illustrated in FIG. 2.

FIG. 2 is a perspective view illustrating, in an exploded manner, an overall configuration of the display device 1. FIG. 3 illustrates a cross-sectional configuration of the display device 1. The display device 1 is a display device used as, for example, a television set. In the display device 1, optical members other than the display panel 10 may be accommodated in a casing 30. The optical members may include, for example, an optical sheet 16, a light guide plate 17 including a light source 17A and so on, a reflection plate 18, and a backlight unit 19. The casing 30 includes a back surface member 31 and a support member 32. The display panel 10 may be configured of the above-described display panel 10A or a display panel 10B that will be described later, and may be attached to the support member 32 by an adhesion member 22. On one end surface of the light guide plate 17, a plurality of LEDs may be provided as a light source 17A. Thus, light emitted from the light source 17A is allowed to pass through the light guide plate 17, to illuminate the display panel 10, and to be extracted as display light on the display surface side.

The optical sheet 16 is a sheet to obtain various optical effects on light that is produced from the light source 17A and illuminates the display panel 10 through the light guide plate 17. The optical sheet 16 may be a single sheet or stacked sheets that have the following functions: for example, a function of separating display light that is incident on the display panel 10 from the light source 17A through the light guide plate 17 into the incident light and a polarized light component orthogonal to the incident light; a function of compensating a phase difference in light waves to widen a viewing angle or to prevent coloring; or a function of diffusing display light.

The light guide plate 17 is adapted to allow light incident from the light source 17A to propagate and to be guided toward the display panel 10, and may have a shape of, for example, a rectangular plate. Examples of materials of the light guide plate 17 may include a material having a high transmittance, for example, glass. However, the light guide plate 17 may be configured of other materials as long as the materials are capable of propagating light from the light source 17A. For example, the light guide plate 17 may be configured of a light scattering material in which light scattering particulates are distributed, or a light diffusing material. Specific examples may include an acrylic resin, polymethyl methacrylate (PMMA), polycarbonate (PC) and cyclic polyolefin (COP), and so on. A shape or a size, a refractive index, a density, and density distribution, and so on of the light guide plate 17 may be arbitrarily adjusted in order to obtain desired characteristics.

As the light source 17A, for example, in addition to a white LED (light emitting diode), LEDs that produce red, blue, and green, and so on may be adopted. Moreover, in addition to point light sources such as LEDs, linear light sources such as a fluorescent lamp may be used. Here, the light source 17A is provided on one end surface (a bottom surface) of the light guide plate 17 as illustrated in FIG. 2. However, this is not limitative, and the light source 17A may be provided, for example, along four sides of the light guide plate 17.

The casing 30 may have, for example, a substantially rectangular parallelpiped shape, and may include two opposite surfaces (a front surface (a support section that supports the display panel 10) and a back surface) and side surfaces between these two surfaces. Specifically, the casing 30 is configured of a back surface plate (the back surface member 31) and a front surface plate (the support member 32). The back surface plate (the back surface member 31) is configured to accommodate the above-mentioned backlight unit 19 and so on. The support section (the support member 32) is a frame body having an opening in a surface facing the back surface member, and includes a support section (a frame section 32A) that is configured to support the display panel 10. It is to be noted that the back surface member 31 and the support member 32 are fastened to each other with a screw 33.

The back surface member 31 is adapted to accommodate, as mentioned above, the backlight unit 19 and so on, exclusive of the display panel 10, to cover back surfaces and side surfaces of them. As a material of the back surface member 31, for example, a metal having high thermal conductivity, specifically aluminum (Al) may be used. In addition, iron (Fe), or polycarbonate (PC) or a plastic added with an ABS resin, or the like may be used.

The support member 32 is adapted to adhere to and fix the display panel 10 as mentioned above, and to seal the backlight unit 19 and so on that are accommodated in the back surface member 31. As a material of the support member 32, similarly to the back surface member 31, for example, a metal having high thermal conductivity, specifically aluminum (Al) may be used. In addition, Fe and so on may be also used.

It is to be noted that, in the present embodiment, the back surface member 31 and the support member 32 are fastened with the screw 33, but this is not limitative. For example, an adhesive may be used for adhesion. In this case, in order to increase adhesion strength, it is preferable that the back surface member 31 and the support member 32 be configured of a same material. Further, the use of a metal material may be preferable, for example, in order to shield electromagnetic waves that are generated from various circuits or electronic components provided in the display device 1. This contributes to reduction in unnecessary radiation that is produced from various circuits or electronic components provided in the casing 30.

The adhesion member 22 is adapted to allow the display panel 10 to be attached to the casing 30 (specifically, the frame section 32A of the support member 32). Examples of the adhesion member 22 may include an adhesive having sufficient adhesion ability and elasticity, specifically, an acrylic resin, an urethane resin, an epoxy resin, a vinyl chloride resin, a modified silicone resin, and so on.

The display device 1 may be completed as follows. As illustrated in FIG. 2, the optical sheet 16, the light guide plate 17, the reflection plate 18, and the backlight unit 19, and so on are accommodated in the casing 30. Then, for example, the casing 30 is mounted on a stand 40 that is provided with driver substrates of the light source 17A and speaker units and so on. Examples of the stand 40 may include a fixed base having a shape of a rectangular plate (a paperweight structure), but this is not limitative. Alternatively, the stand 40 may have a tilt-swivel mechanism capable of changing vertical and horizontal orientations of a screen of the display panel 10.

In the display device 1, light emitted from the light source 17A is incident on the display panel 10 through the light guide plate 17 and the optical sheet 16. The incident light passes through the polarization plate 15B, and permeates the liquid crystal layer 13 while being modulated for each pixel based on a picture voltage applied between the transparent electrodes on the TFT substrate 12 and the CF substrate 14. The light that permeates the liquid crystal layer 13 permeates the color filter to be extracted as color display light externally of the polarization plate 15A (on the display surface side).

Figure 7:
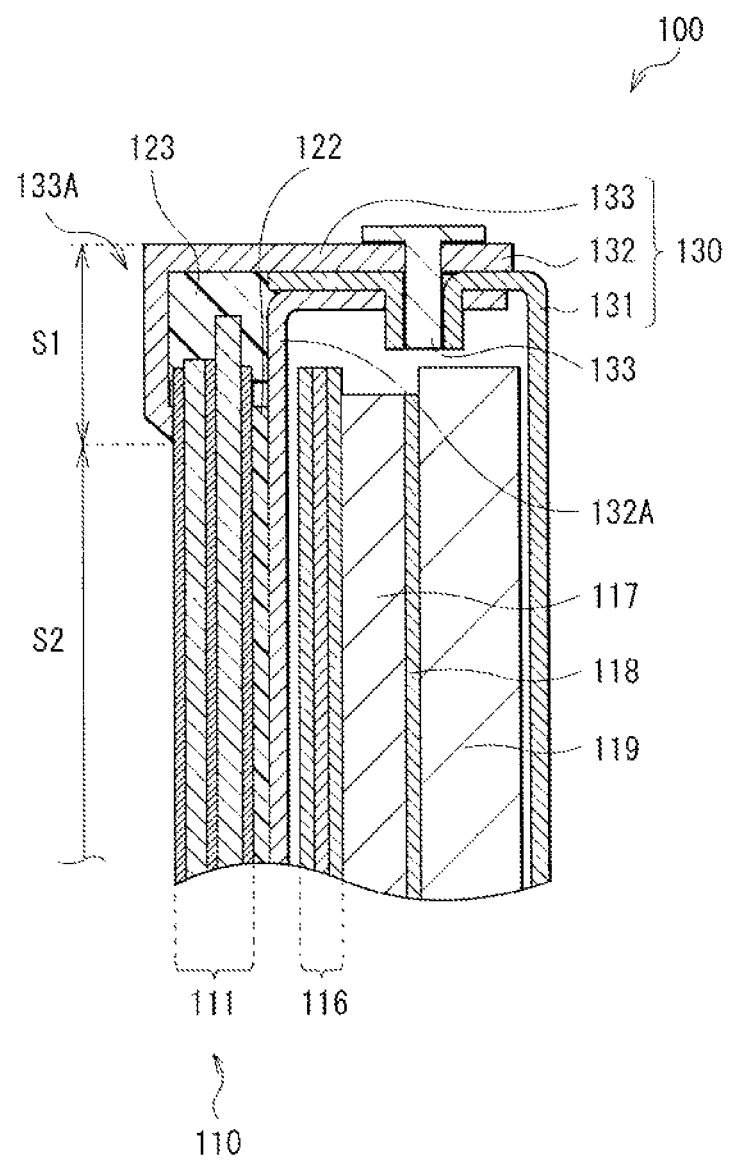
FIG. 7 is a cross-sectional view of a general display device.

FIG. 7 illustrates a cross-sectional configuration of a general display device 100. The display device 100 has a configuration in which, similarly to the display device 1 according to the above-described example embodiment, an optical sheet 116, a light guide plate 117, a reflection plate 118, and a backlight unit 19 are accommodated in a back surface member 131 and a support member 132 that constitute a casing 130. The display panel 110 is adhered to a frame section 132A of a support member 132. In the display device 100, the casing 130 is configured of, in addition to the back surface member 131 and the support member 132, a front surface member 133 in a frame shape that covers an outer edge of the display panel 110 from the front surface. The front surface member 133 is formed of a metal such as Al or Fe, or the like, similarly to the back surface member 131 and the support member 132. Accordingly, in the display device 100, the number of components is increased, which puts more weight.

Moreover, a frame region S1 of the display device 100 constitutes a frame section 133A of the front surface member 133. The frame section 133A holds the display panel 110 between the frame section 133A and the support member 132. Accordingly, the front surface member 133 involves an overlap region that overlaps the outer edge of the display panel 110 and a screw fixing region that fixes the front surface member 133 to the back surface member 131 or the support member 132. That is, the display device 100 involves the frame region S1 of a certain extent, and moreover, a display region S2 of the display panel 110 is narrowed because the outer edge of the display panel 110 is covered with the front surface member 133.

On the other hand, in the display device 1 according to the present embodiment, the sealing resin layer 20 is provided on the peripheral edge of the display panel 10 (or 10A), and the surface on the display side of the sealing resin layer 20 is molded to form the same plane as the surface of the display panel 10 (or 10A). Thus, a configuration of structural members is simplified. Specifically, the front surface member 133 of the casing 130 in the general display device 100 is eliminated.

As described above, in the display device 1 according to the present embodiment, the sealing resin layer 20 is provided and molded on the peripheral edge of the display panel 10 (10A). The sealing resin layer 20 includes the same plane as the surface of the display panel 10. This contributes to a simplified configuration of structural members. Hence, it is possible to reduce cost and to reduce weight of the display device 1.

Moreover, specifically, the level difference in the end surface of the display panel 10A, which is caused by a combination of structural members of different sizes, is embedded in the sealing resin layer 20, allowing the end surface to be planarized. Hence, it is possible to use the display panel 10A as a front surface member as it is. In other words, the front surface member 133 in the display device 100 becomes unnecessary. The front surface member 133 holds the display panel 110 between the front surface member 133 and the support member 132 or the like and covers the outer edge of the display panel 110, including the end surface. Hence, flexibility of design in the vicinity of the display surface is improved, enhancing designability of appearance of the display device 1.

Further, the front surface member including the screw fixing region and so on is eliminated, allowing the sealing resin layer 20 to form a frame of the display panel 10 without fixing with screw. Hence, it is possible to narrow a frame of the display device 1. Furthermore, since the overlap region between the front surface member 133 and the display panel 110 is eliminated, an effective pixel region of the display panel 10 is broadened in the display device 1.

Moreover, in the present embodiment, the lamination film 21 is attached to the entire display surface of the display panel 10A and the sealing resin layer 20 for exterior finish. However, the sealing resin layer 20 may be colored in black or the like, making it possible to use the surface of the display panel 10A and the surface of the sealing resin layer 20 for exterior finish as it is. Moreover, since a colored layer is provided on the peripheral edge of the display panel 10A, light leakage or the like from the side surface is reduced, making it possible to enhance display characteristics of the display device 1.

In the following, description will be given on one modification example and one application example related to the above-described example embodiment. It is to be noted that similar components to the above-described example embodiment will be denoted by similar reference numerals, and description thereof will be omitted.

2. Modification Example

Figure 4:
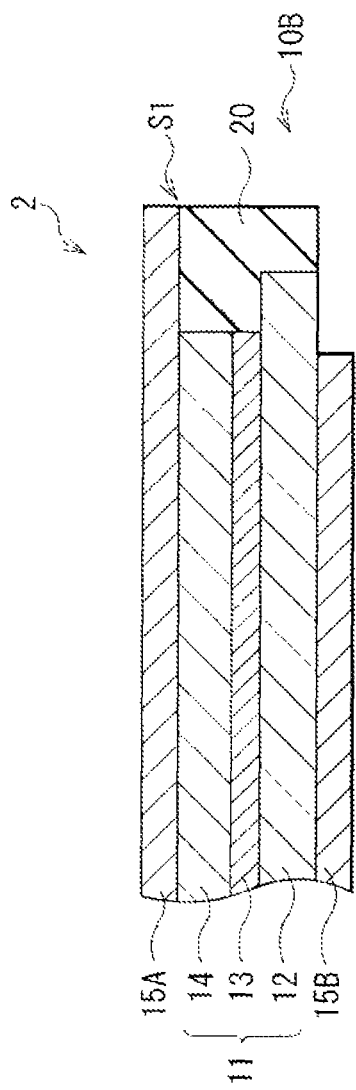
FIG. 4 is a cross-sectional view illustrating a configuration of a main part of a display device according to one modification example of the present disclosure.

FIG. 4 illustrates a cross-sectional configuration of a main part (a display panel 10B and its periphery) of a display device 2 according to one modification example of the example embodiment of the present disclosure. In the present modification example, the display panel 10B is configured of the cell 11 that includes the liquid crystal layer 13 between the TFT substrate 12 and the CF substrate 14, and has a configuration in which the sealing resin layer 20 is provided on the peripheral edge of the display panel 10B (the cell 11). In the present modification example, the surface on the display side of the sealing resin layer 20 forms the same plane as the surface of the CF substrate 14 of the cell 11, and on the plane S1, the polarization plate 15A is provided. A difference from the above-described example embodiment is in that the polarization plate 15A is extended to an end surface of the sealing resin layer 20.

As mentioned above, in the display device 2 according to the modification example, the sealing resin layer 20 is formed on the peripheral edge of the display panel 10B, forming the same plane as the CF substrate 14 that constitutes the display panel 10B. Thus, similarly to the above-described example embodiment, provision of the front surface member may be eliminated. In other words, a configuration of structural members is simplified, leading to weight reduction. It is also possible to enhance designability of appearance.

Further, since the front surface member is eliminated, it is possible to achieve narrowing of a frame. Furthermore, to the plane S1 that is formed by the CF substrate 14 and the sealing resin layer 20, attached is the polarization plate 15A, which is extended to the end surface of the sealing resin layer 20. Hence, it is possible to use the polarization plate 15A for exterior finish as it is, leading to a further cost reduction.

3. Application Example

Figure 5:
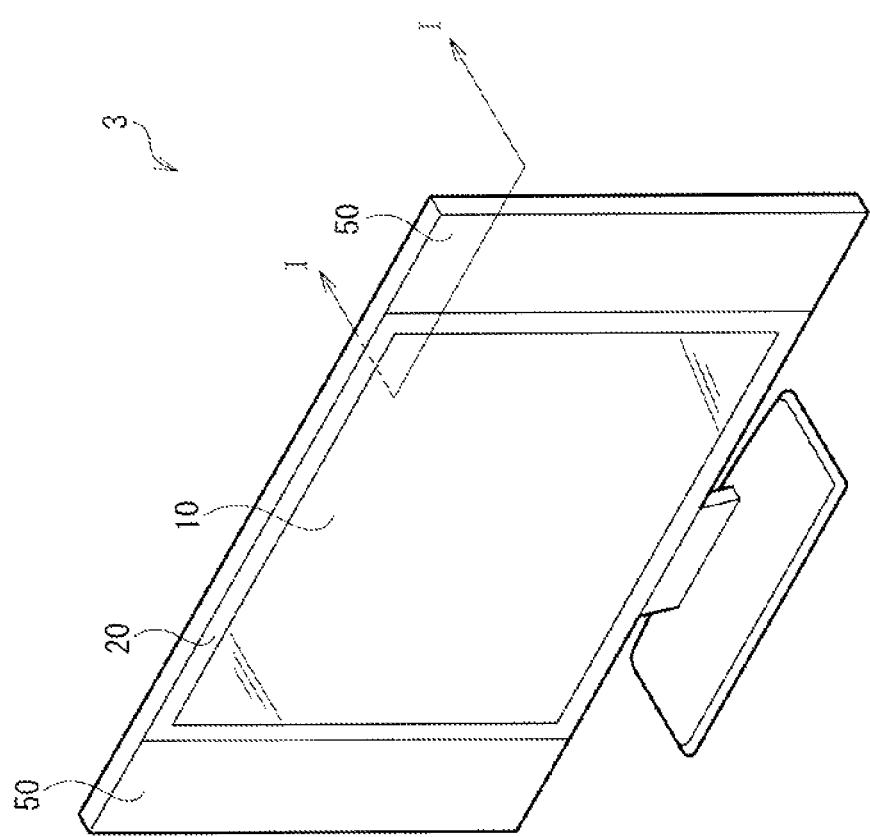
FIG. 5 is a perspective view illustrating an appearance of one application example of the display device according to the above-mentioned example embodiment and so forth.
Figure 6:
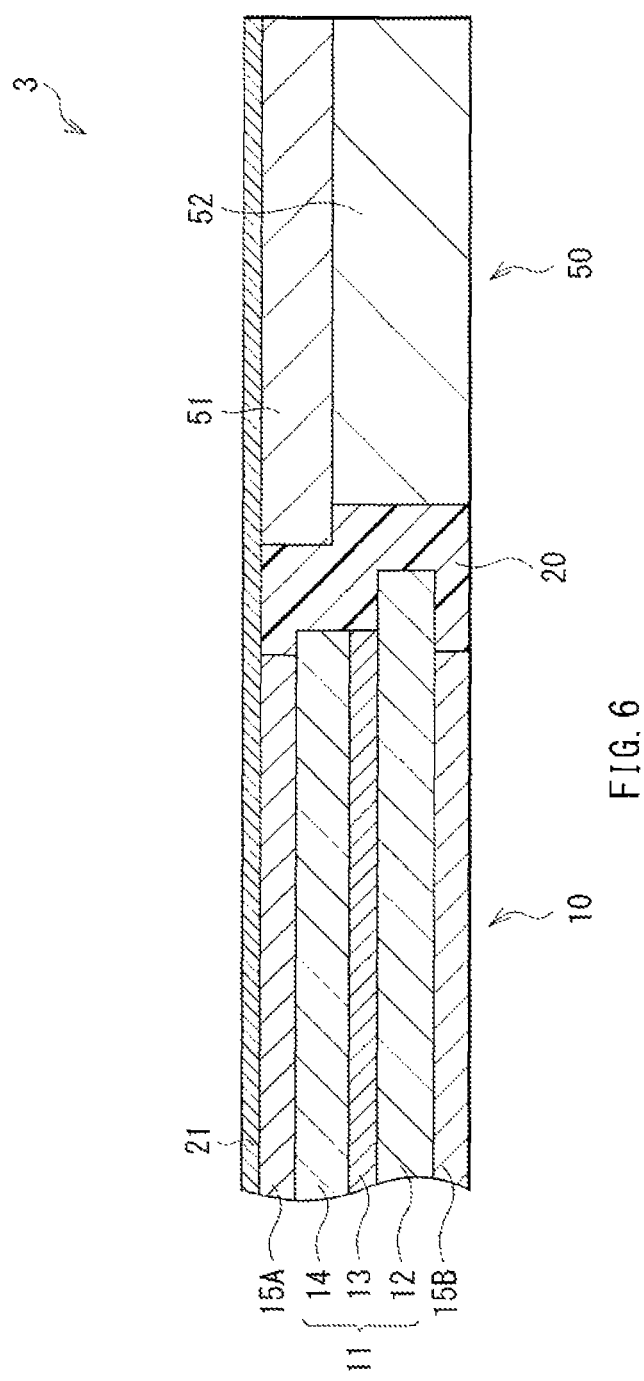
FIG. 6 is a cross-sectional view of an electronic apparatus illustrated in FIG. 5.

The display devices 1 and 2 as described in the above-mentioned example embodiment and the modification example may be suitably used in an electronic apparatus 3 (a television set) as illustrated in FIG. 5. FIG. 6 illustrates a cross-sectional configuration along a line I-I (the display panel 10 and a peripheral member 50) of the television set as illustrated in FIG. 5. The television set may have a configuration in which, for example, the peripheral member 50 is mounted to each of both sides of the display device 1. The peripheral member 50 may include, for example, a speaker 51 and a metal plate 52. In this way, in the display devices 1 and 2 according to the example embodiment and so forth of the present embodiment, it is possible to use the sealing resin layer 20 as a connection member between the display panel 10 and the peripheral member 50.

Although description has been made by giving the example embodiment and the modification example as mentioned above, the contents of the present technology are not limited to the above-mentioned example embodiment and so forth, and may be modified in a variety of ways. For example, in the above-described example embodiment and so forth, the display devices 1 and 2 have been exemplified by a liquid crystal display device. However, examples of possible applications may include a plasma display device or an organic electroluminescence display device.

Moreover, each structural member as described in the above-mentioned example embodiment and so forth is merely exemplary. It is not necessary to include all the structural members, and another structural member or other structural members may be further provided. For example, as a heat dissipation mechanism of heat produced from the light source 17A, a heat sink may be attached to at least part of the back surface of the display device, for example, a lower end portion where the light source 17A is disposed. For the heat sink, a metal having high thermal conductivity may be desirably used. For example, a mold of a block of aluminum (Al) or the like may be used.

It is to be noted that effects described in the specification are merely exemplified and not limitative, and effects of the present disclosure may be other effects or may further include other effects.

It is possible to achieve at least the following configurations from the above-described example embodiments of the disclosure.

(1) A display device, including:
a display panel that includes a display layer on at least a first substrate; and
a sealing resin layer that is provided on a peripheral edge of the display panel,
wherein a surface of the sealing resin layer and a surface of the display panel include a same plane.

(2) The display device according to (1), wherein the sealing resin layer is colored.

(3) The display device according to (1) or (2), wherein the display panel further includes a second substrate that is arranged facing the first substrate with the display layer in between.

(4) The display device according to (1) or (2), wherein the display panel further includes a second substrate and polarization plates, the second substrate being arranged facing the first substrate with the display layer in between, the polarization plates being arranged on respective opposite surfaces to the display layer of the first substrate and the second substrate.

(5) The display device according to (3) or (4), wherein the display panel has a rectangular shape and includes, along at least one side, a level difference in a stacking direction of the first substrate and the second substrate, the display panel inclusive of the level difference being embedded in the sealing resin layer.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
   a display panel that includes a display layer, a first substrate and a first polarization plate, wherein the display panel is configured to display images viewable by a viewer from a front side of the display panel during operation, and wherein the first substrate is between the display layer and the first polarization plate; and
   a sealing resin layer that is provided on a peripheral edge of the display panel,
   wherein a surface of the sealing resin layer extends from beyond a side of the first substrate, the side of the first substrate being transverse to the front side of the display panel, to a surface of the first substrate, in which the surface of the sealing resin layer and the surface of the first substrate face the front side of the display panel and are in a same plane.

2. The display device of claim 1,
   wherein the first polarization plate has an inner surface and an outer surface, wherein the inner surface of the first polarization plate is opposite the outer surface of the first polarization plate, wherein the outer surface of the first polarization plate faces towards the front side of the display panel, and wherein the inner surface of the first polarization plate is in the same plane as the surface of the sealing resin layer and the surface of the first substrate.

3. The display device of claim 2,
   wherein a front outer surface of the display panel includes the outer surface of the first polarization plate.

4. The display device of claim 1,
   wherein the display panel includes, along at least one side transverse to the front side, a level difference in a stacking direction of the first substrate and the display layer,
   wherein a portion of the least one side of the display panel inclusive of the level difference is embedded in the sealing resin layer, and
   wherein an outer surface of the sealing resin layer opposite to the portion of the at least one side of the display panel is planar.

5. The display device of claim 4,
   wherein an outer surface of the first polarization plate, at at least one side of the first polarization plate transverse to the front side of the display panel, extends from the outer surface of the sealing resin layer.

6. The display device of claim 5, wherein the outer surface of the first polarization plate and the outer surface of the sealing resin layer are in a same plane.

7. The display device of claim 5, wherein an inner surface of the first polarization plate is in the same plane as the surface of the sealing resin layer and the surface of the first substrate, and wherein the inner surface of the first polarization plate is opposite a second outer surface of the first polarization plate facing towards the front side of the display panel.

8. The display device of claim 1, wherein the sealing resin layer is colored.

9. The display device according to claim 1, further comprising:
   a peripheral member provided at a peripheral edge of the sealing resin layer, wherein the peripheral member is coupled to the display panel by the sealing resin layer.

* * * * *